United States Patent [19]

Bea

[11] 4,008,006
[45] Feb. 15, 1977

[54] WIND POWERED FLUID COMPRESSOR

[76] Inventor: Karl J. Bea, 128 Dewitt St., Syracuse, N.Y. 13203

[22] Filed: Apr. 24, 1975

[21] Appl. No.: 571,395

[52] U.S. Cl. .................................. 417/271; 60/398; 416/41; 417/336

[51] Int. Cl.² ............................................. F04B 1/10

[58] Field of Search ......... 417/334, 335, 336, 271; 60/398, 347; 416/133, 41, 150

[56] References Cited

UNITED STATES PATENTS

| | | | |
|---|---|---|---|
| 1,649,356 | 11/1927 | Louis | 417/471 |
| 1,675,159 | 6/1928 | Burch | 417/334 |
| 2,539,862 | 1/1951 | Rushing | 417/336 X |
| 2,555,787 | 6/1951 | D'Amelio | 417/336 X |
| 2,628,564 | 2/1953 | Jacobs | 417/334 X |
| 2,688,285 | 9/1954 | Stockett, Jr. et al. | 417/336 X |
| 3,269,121 | 8/1966 | Bening | 60/398 |
| 3,319,874 | 5/1967 | Welsh et al. | 417/271 |

Primary Examiner—William L. Freeh
Assistant Examiner—Edward Look
Attorney, Agent, or Firm—Edward L. Benno

[57] ABSTRACT

A wind machine comprising a fixed or controlled pitch blade assembly to drive a variable displacement or variable clearance fluid compressor. Means which may be mechanical, hydraulic, pneumatic or electrical interconnect the blade assembly and the compressor to vary the fluid displacement or clearance volume of the compressor as a function of the drag or lift forces of the wind on the blade assembly.

11 Claims, 5 Drawing Figures

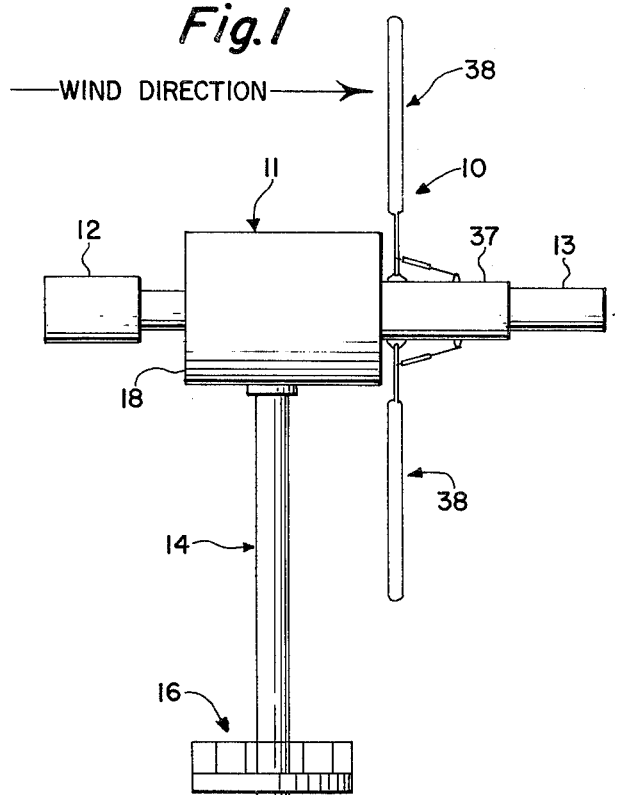
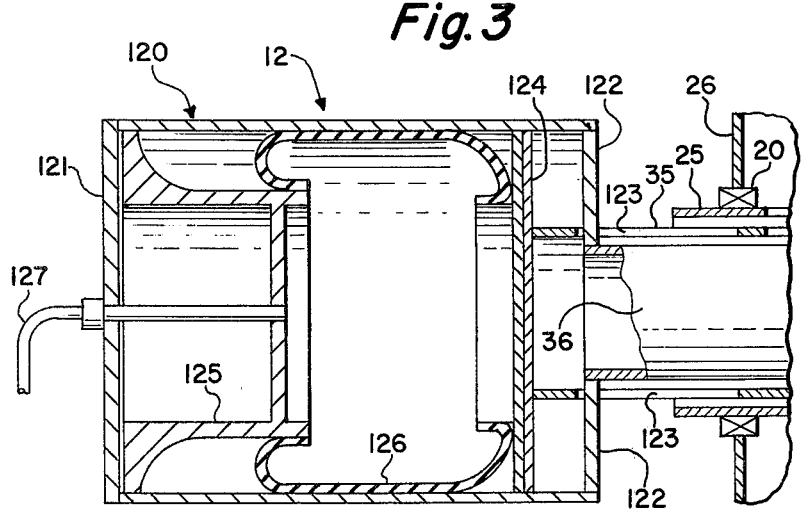
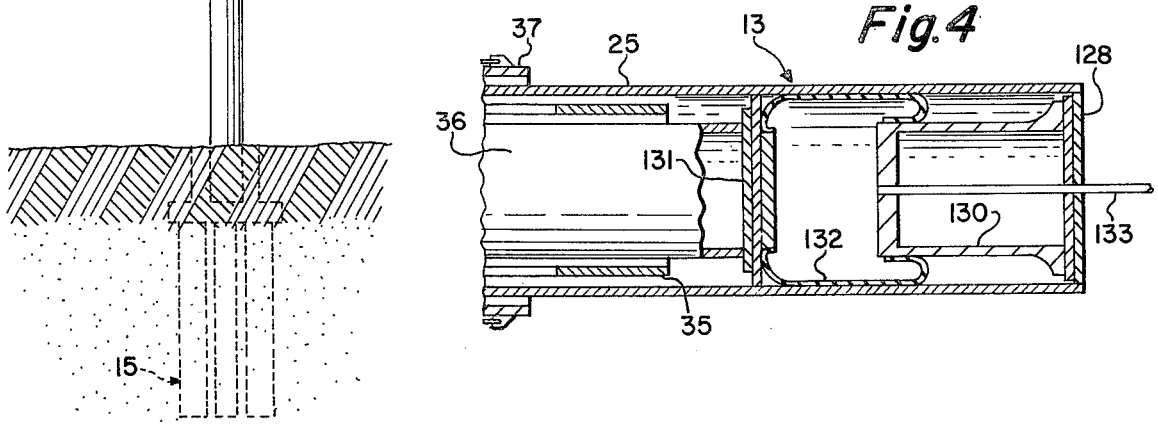

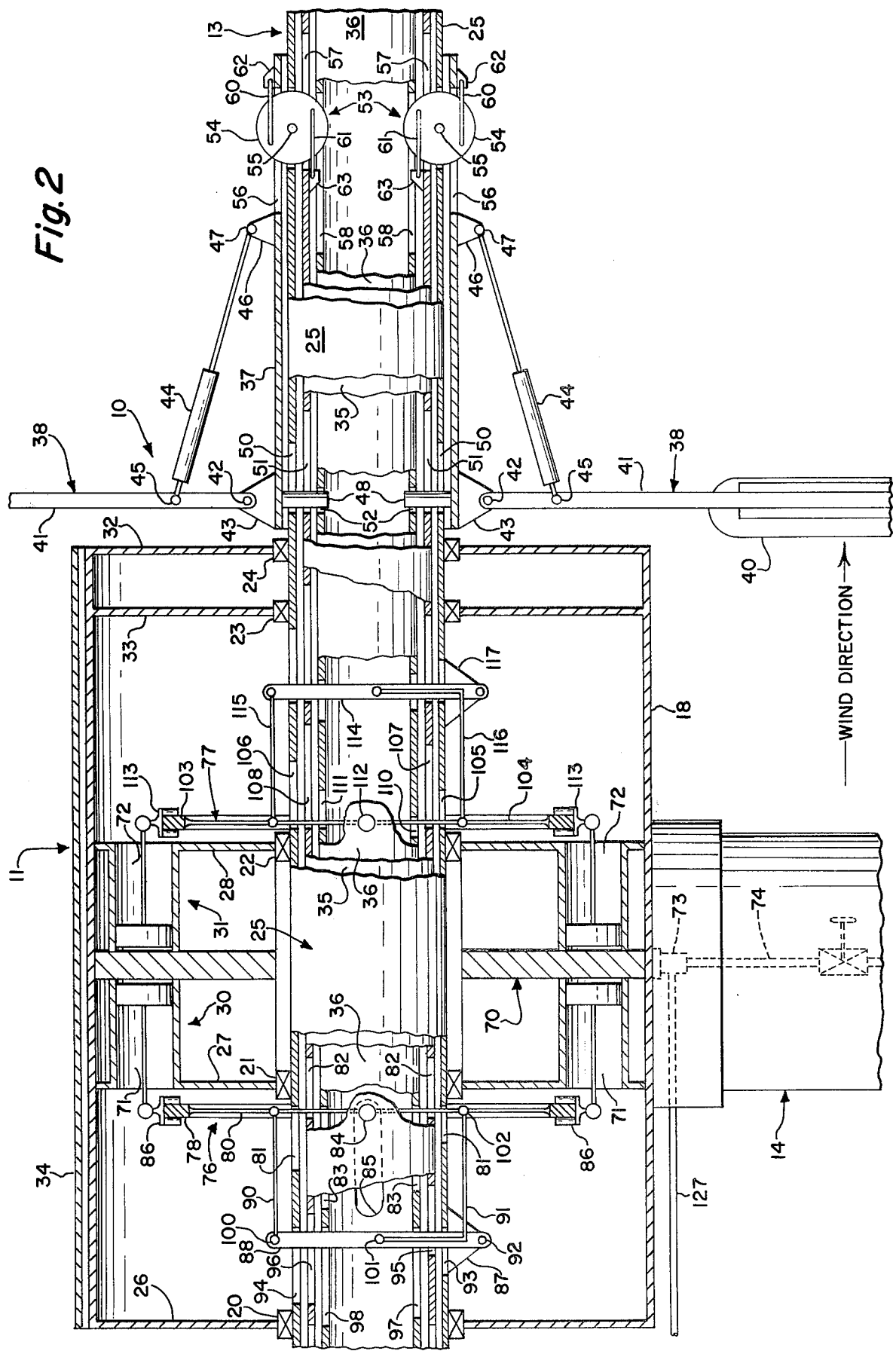

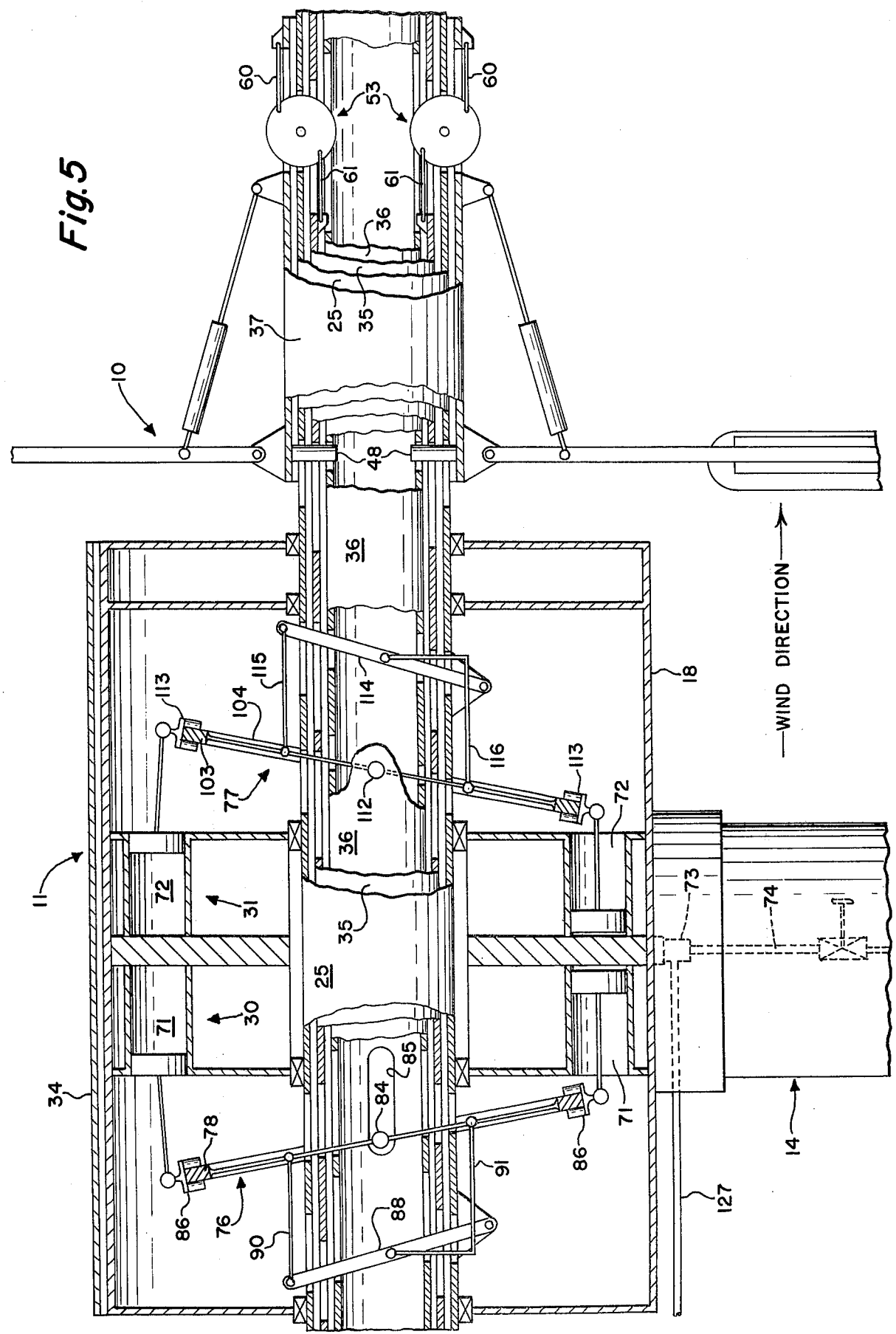

WIND POWERED FLUID COMPRESSOR

BACKGROUND OF THE INVENTION

It is well known to those skilled in the art that it is difficult to efficiently use wind as a source of power because of the generally wide range of wind speeds encountered in most areas of the world. The power of the wind is of course a function of wind speed cubed, and while many devices are known which convert wind power to another form of useable power, most are limited to a relatively small increment of wind velocity for practical or efficient operation. The subject invention converts the power of the wind to another form of useable power over a wider range of wind velocities than heretofore known.

SUMMARY OF THE INVENTION

The subject invention contemplates a fixed or controlled pitch blade assembly driving a variable displacement or variable clearance volume fluid compressor. The compressor may be conveniently coaxially mounted with the blade assembly on a mast or tower. The blade assembly and the compressor may then be driven about a horizontal axis, and turn as a unit about a vertical axis into the wind. With blade assemblies constructed to rotate about a vertical axis, the compressor may be arranged coaxially thereof to be driven about a vertical axis.

The fixed or controlled pitch blade assembly may comprise various known blade constructions and may be sized as desired for the size of the compressor assembly. The pitch of the blade assembly may be fixed in its original construction, or by adjustment thereafter.

The compressor assembly may comprise various known forms of variable displacement or variable clearance volume fluid compressors, and may comprise one or more individual compressor units driven by the blade assembly. When more than one compressor unit is used, the fluid inputs and outputs of the compressor units may be connected through suitable valves and conduits either in parallel or in series, or in combinations thereof dependent upon the desired developed fluid pressures.

Essential to the invention is the provision of an assembly connected between the blade assembly and the fluid clearance volume or displacement varying means of the compressor assembly to vary the fluid clearance volume or displacement of the compressor assembly directly with one of the drag or lift forces of the wind on the blade assembly. Thus the invention permits the compressor assembly load to be directly matched to the power of the wind as the wind varies in velocity over a wide range of velocities.

As desired or necessary, various known controls may be provided to dampen vibrations in the machine, direct the output of the compressor from the machine, or to cone the blades of the blade assembly out of the wind when the wind attains gale velocities.

The energy of the wind collected by the invention and represented by the compressed fluid output of the compressor assembly may be used as desired to operate other devices.

In one preferred embodiment of the invention, the compressor assembly comprises a swash plate compressor assembly connected to be rotated by the blade assembly at the same speed that the blade assembly is rotated by the wind. Of course, it is contemplated that gearing may be provided to rotate the compressor assembly at some desireable speed other than that which the blade assembly is rotated. In the form shown in the drawings, the swash plate compressor assembly takes the form of two compressor units mounted back-to-back against a common valve block.

Conveniently, concentric tubes are used to interconnect the two compressor units to the blade assembly. One tube constitutes the main torque shaft and is connected to direct the rotation of the blade assembly to a rotation of the swash plates of the two compressor units. An outer sleeve and two inner tubes are used with mechanical linkage members to change the angle of the two swash plates to vary the fluid displacement of the compressor units directly with the drag force of the wind on the blade assembly. The outer sleeve carries the wind blades and as the drag force of the wind varies, the sleeve will be axially translated. The axial translation of the sleeve, through the linkage members and the two inner tubes, will directly vary the angle of the two swash plates with the drag force of the wind on the wind blades. Thus as the drag force of the wind increases, the angle of the two swash plates will increase, and as the angle of the swash plates increases, the fluid displacement of the compressor units will increase in a known manner. In a light wind the two swash plates will be vertical or perpendicular to their axis of rotation and substantially no reciprocation of the compressor pistons will occur, and thus, the compressor units will not load the wind blade assembly. But as the wind velocity increases, the drag force which is proportional to the square of the wind velocity, will cause the two swash plates to be angled in proportion to the drag force. Because the RPM of a fixed pitch blade, in the optimum power range and if the tip speed ratio is held constant, varies directly as the wind speed, the load of the compressor units will substantially match the wind turbine power or substantially the wind velocity cubed.

BRIEF DESCRIPTION OF THE DRAWINGS

FIG. 1 is a side elevational view of the wind machine of the subject invention;

FIG. 2 is an enlarged fragmentary view of the central portion of the upper end of the machine of FIG. 1, shown in section and somewhat diagramatically and with the various parts of the machine shown as in a light wind condition;

FIG. 3 is a view similar to FIG. 2 and shows the structure which has been cut away from the left end of FIG. 2;

FIG. 4 is a view similar to FIG. 2 and shows the structure which has been cut away from the right end of FIG. 2;

FIG. 5 is a view similar to FIG. 2, but showing the various parts of the machine as in a relatively high velocity wind condition.

DETAILED DESCRIPTION OF A PREFERRED EMBODIMENT

In order to simply and clearly describe the present invention much of the structure of a preferred embodiment is shown substantially diagramatically. Those skilled in the art will understand that known constructions and components can be used for the constructions and components shown diagramatically within the scope of the function, operation and result of the invention as hereinafter described.

The wind machine of the subject invention may be constructed in many different sizes dependent upon the amount of wind power desired to be converted to a compressed fluid. For example, as shown in FIG. 1 the blade assembly 10 may conveniently be 50 feet in diameter.

In addition to the blade assembly 10, the machine comprises a central compressor assembly 11, a forward compressor balancing assembly 12, and a rearward compressor control assembly 13, all coaxially arranged. The housing 18 of the compressor assembly 11 is carried for rotation about a vertical axis on the upper end of the mast assembly 14. The base of the mast assembly 14 comprises a foundation structure 15. A platform 16, which is vertically movable, may be provided for construction and maintenance of the wind machine.

As shown in FIG. 2, the housing 18 of the compressor assembly 11, is carried on the upper end of the mast assembly 14. The shape of the housing 18 may conveniently be cylindrical about a horizontal axis. The sections taken in FIGS. 2–5 are essentially in a vertical plane centrally through the machine. The housing 18 is provided with a central opening therethrough arranged on a horizontal axis and defined by the bearing assemblies 20, 21, 22, 23 and 24. The bearing assemblies 20–24 rotationally support the main torque tube 25. Bearing assembly 20 is mounted in the forward wall 26 of the housing 18, and bearing assemblies 21 and 22 are respectively mounted in walls 27 and 28 forming part of the forward compressor unit 30 and the rearward compressor unit 31, respectively. Bearing assembly 24 is mounted in the rearward wall 32 of the housing 18, and bearing assembly 23 is mounted in a wall 33 within the housing 18 and spaced from the rearward wall 32. Suitable known shrouding which is merely exemplified by the member 34 may be provided to air cool the housing 18.

The main torque tube 25 terminates forwardly of the wall 26 of the housing 18 as may be seen in FIG. 3, and terminates at its rearward end in the rearward compressor control assembly 13 as shown in FIG. 4. Because of the arrangement of the two tubes 35 and 36 concentrically within the main torque tube 25, and the arrangement of the other structural members cooperating therewith, the tubes 25, 35 and 36 are shown in a radially spaced apart relationship for purposes of clarity in understanding. It should be understood that alternatively sleeve bearings (not shown) may be provided between the tubes or the diameters may be varied so that the outer diameter of one tube substantially equals the inner diameter of the tube in which it is carried. While the main torque tube 25 only rotates, the tubes 35 and 36 axially translate in addition to rotating in a manner to be hereinafter described.

The machine includes one further tubular sleeve member 37, and that member is the hub of the blade assembly 10. The sleeve 37 rotates with and is axially translated relative to the main torque tube 25. As described relative to the other tubes, the sleeve 37 may be supported by sleeve bearings on the main torque tube 25.

As shown in FIGS. 2 and 5, the sleeve 37 and the tubes 25, 35 and 36 are provided with various slots to permit those members and the various members carried thereon to relatively axially translate in a manner to be hereinafter described. Those skilled in the art will understand that although a number of the members and slots are shown essentially in one plane, those members and slots may, where necessary, be duplicated circumferentially of the machine.

The blade assembly 10 which rotates the tubes 25, 35 and 36 comprises, in addition to the sleeve 37, at least one pair of diametrically opposed wind blade assemblies 38. The wind blade assemblies 38 may be constructed in known forms of blade assemblies in which the pitch is fixed or may be fixed, and comprises air foil blades 40 and supporting struts 41. The hub ends of the struts 41 are pivotally connected at 42 to suitable brackets 43 which are secured to the outer surface of the sleeve 37. The brackets 43 and pivotal connections 42 carry the blade assemblies 38 in radially outwardly extending directions and permit the blade assemblies 38 to pivot or cone rearwardly toward the main torque tube 25. The blade assemblies 38 are maintained in their normally radially outward positions as shown by fluid shock absorbers 44. One end of each shock absorber 44 is pivotally connected at 45 to one of the struts 41 and at the other end thereof to a bracket 46 by pivotal means 47. The brackets 46 are secured to the outer surface of the sleeve 37 rearwardly of the brackets 43. Known forms of shaft brake mechanisms may be provided for the main torque tube 25, and mounted between the compressor housing walls 32 and 33, to brake the main torque tube 25 at predetermined excessive wind velocities and permit the shock absorbers 44 to collapse to safely cone the blade assemblies 38 toward the main torque tube 25. Known controls may be provided to detect excessive wind velocities, to then control the brake mechanisms to reduce the rotational speed of the main torque tube 25, and to thereafter control the retraction of the shock absorbers 44.

The wind induced torque on the blade assembly 10 is applied to the main torque tube 25 through the pins 48 which are secured to the inner surface of the sleeve 37 and extend radially inwardly through slots 50 in the main torque tube 25. It should be understood that the slots 50, and the various slots in the tubes 25, 35, 36, and the sleeve 37 to be hereinafter described, are of appropriate widths in a circumferential direction to transmit the described torques and allow the members extending through these slots to move in axial directions as described. The slots 50 have a length sufficient to permit the sleeve 37 to axially translate between the positions shown in FIGS. 2 and 5.

In addition to rotating the main torque tube 25, the pins 48 further extend radially inwardly through slots 51 in tube 35 and slots 52 in tube 36. Thus it may be seen that sleeve 37, main torque tube 25, and tubes 35 and 36 all rotate together as the wind drives the blade assembly 10. The slots 52 in the inner tube 36 are substantially the diameter of the pins 50 so that the tube 36 directly follows the axial translations of the blade assembly 10. The slots 51 in the intermediate tube 35 are of a length sufficient to permit the tube 35 to be axially translated in a forward direction the same amount that the sleeve 37 is translated in a rearward direction, as may be seen in FIGS. 2 and 5.

The means which causes the tube 35 to be translated in the opposite direction from the sleeve 37 is the reversing link mechanism 53. The mechanism 53 comprises a pair of disks 54 rotatively mounted within diametrically opposed slots in the main torque tube 25 by pins 55. The pins 55 are secured to the main torque tube 25 and carry the disks 54 for rotation in a plane diametrically through the tube 25. The disks 54 also extend through slots 56 in sleeve 37, slots 57 in intermediate tube 35, and slots 58 in inner tube 36. Slots 56, 57 and 58 are clearance slots which permit the sleeve 37, the tube 35, and the tube 36, respectively, to translate axially relative to the disks 54. The mechanism 53 further comprises two pairs of links 60 and 61. One end of each link 60 is pivotally carried in a bracket 62 which is secured on the outer surface of the sleeve 37 at the rearward end thereof. From the brackets 62, the links 60 extend in a forward direction to pivotal connections at the other ends thereof with the disks 54. One end of each link 61 is pivotally carried in a bracket 63 which is secured on the inner suface of the intermediate tube 35. From the brackets 63, the links 61 extend in a rearward direction to pivotal connections at the other ends thereof with the disks 54 at diametrically opposed positions from the connections of the links 60. From the foregoing it may be seen that as the sleeve 37 is translated rearwardly from a position such as shown in FIG. 2 to a position such as shown in FIG. 5, the brackets 62 will pull the links 60 to rotate the disks 54 in the main torque tube 25, which rotation of the disks 54 will cause the links 61 to be pushed forwardly. The forward movement of the links 61 will cause the intermediate tube 35 to be translated forwardly the same distance that the sleeve 37 is translated rearwardly.

Thus, as the increasing drag of the wind at increasing wind velocities causes the fixed pitch blade assembly 10 to be rearwardly translated in addition to being rotated, the pins 48 will rotate and rearwardly translate the inner tube 36, while the pins 48 and the reversing mechanism 53 will respectively rotate and forwardly translate the intermediate tube 35. That rotation and relative translation of the tubes 35 and 36 with the rotation of the main torque tube 25 is used to angle and rotate the swash plates of the compressor units 30 and 31.

The inner tube 36 controls the compressor unit 31 and the intermediate tube 35 controls the compressor unit 30. As previously noted, the compressor units 30 and 31 are shown substantially diagramatically, it being understood that the rotation of the tube 25 with the rotation and translation of the tubes 35 and 36 may be used to drive and control a number of different constructions of variable displacement fluid compressors known in the art. As shown, the head ends of the compressor units 30 and 31 have a common valve block there between. Suitable known valves and conduits including intake and exhaust check valves (not shown) may be provided in the valve block 70 to direct fluid from a reservoir (not shown) to and through the reciprocating piston and cylinder assemblies 71 and 72 to a common compressed fluid outlet 73. The fluid outlet 73 includes a rotatable coupling for directing compressed fluid through the conduit 74 and downwardly of the mast 14 as the compressor and blade assemblies may rotate on the mast 14. As shown, the compressor unit 30 includes two piston and cylinder assemblies 71, and the compressor unit 31 includes two piston and cylinder assemblies 72. It should be understood that the invention contemplates a plurality of piston and cylinder assemblies 71 and 72 which may be arranged in a complete circle about the main torque tube 25 and within the housing 18.

The reciprocating movements of the pistons and cylinder assemblies 71 are produced by the swash plate 76, and of piston and cylinder assemblies 72 by the swash plate 77. Swash plate 76 comprises a ring 78 carried on a spoke assembly 80. The spoke assembly 80 extends through slots 81 in the main torque tube 25, slots 82 in the intermediate tube 35, and slots 83 in the inner tube 36. A pin 84 is secured to the hub spoke assembly 80 at a right angle thereto as shown in the drawings. The pin 84 extends through slots 85 in the inner tube 36 and the ends of the pin 84 are journaled into diametrically opposite wall portions of the intermediate tube 35. Thus as the tube 35 is rotated it will rotate the pin 84 to in turn rotate the spoke assembly 80, to in turn rotate the ring 78 of the swash plate 76. The ring 78 rotates within the follower plate assemblies 86 of the piston and cylinder assemblies 71. The follower plate assemblies 86 are each connected by a ball joint to the end of the piston rod of one of the piston and cylinder assemblies 71, and each follower plate assembly 86 comprises a pair of roller bearings mounted on each side of the ring 78. As shown in FIG. 2, rotation of the ring 78 within the follower plate assemblies 86 causes no reciprocating movement of the piston and cylinder assemblies 71. However, as the swash plate 76 is pivoted about the axis of the pin 84 from the position shown in FIG. 2 toward that shown in FIG. 5, the swash plate 76 will nutate in a known manner as swash plate 76 with the tubes 25, 35 and 36 rotate about the horizontal axis of the machine. The nutation of the swash plate 76 will, through the ring 78 and the follower plate assemblies 86, cause the pistons of the piston and cylinder assemblies 71 to reciprocate in the cylinders thereof. As the pistons move outwardly of the cylinders, fluid to be compressed is drawn into the cylinders, and discharged therefrom as the pistons are moved inwardly. As noted previously, the intakes and discharges of the piston and cylinder assemblies may be, through suitable known valving in the valve block 70, connected in series or parallel or a combination thereof to deliver compressed fluid to outlet conduit 74 at desired pressures and volumes. Of course, it may be seen that the actual developed fluid pressures and the volume of fluid delivered at those pressures will be dependent upon the rotational speed and the angle of the swash plate 76. The rotational speed of the swash plate 76 is dependent upon the speed at which the wind rotates the blade assembly 10 which in turn rotates the tubes 25, 35 and 36 to in turn rotate the swash plate 76 as described. The angle of the swash plate 76 is determined by the forward translation of the intermediate tube 35.

As described above, the intermediate tube 35 in being forwardly translated carries the pin 84 and the swash plate 76 forwardly. That translating movement through a four-bar linkage arrangement is converted to a tilting movement of the swash plate 76. The four-bar linkage arrangement comprises a bracket 87 secured to the outer surface of the main torque tube 25, a lever 88, a lever 90 and a bell-crank 91. One end of the lever 88 is pivotally connected to the bracket 87 by pin means 92, and from that pivotal connection the lever 88 extends diagramatically through the tubes 25, 35 and 36. Slots 93 and 94 in main torque tube 25 permit the lever 88 to extend therethrough. Slots 95 and 96 in intermediate tube 35 permit the lever 88 to extend therethrough, and slots 97 and 98 permit the lever 88 to extend through inner tube 36. The other end of the lever 88 is pivotally connected to one end of lever 90 by pin means 100. The other end of lever 90 is pivotally connected to the spoke assembly 80 of the swash plate 76. One leg of the bell-crank 91 extends through slot 93 in tube 25, slot 95 in tube 35 and slot 97 in tube 36, and the end of that leg is pivotally connected at 101 to the lever 88 intermediate the ends thereof. The end of the other leg of the bell-crank 91 is pivotally connected at 102 to the spoke assembly 80 of the swash plate 76 to define the four-bar linkage that controls the angle of the swash plate 76 as the intermediate tube 35 is translated forwardly. Since there is no translation of the main torque tube 25, forward translation of the intermediate tube causes the lever 88 to be pivoted about pin means 92 in a counter-clockwise direction as viewed in FIGS. 2 and 5 by the bell-crank 91 as the pin 84 and swash plate 76 are moved forwardly by the tube 35. That pivoting movement of the lever 88 through the lever 90 and the bell-crank 91 causes the swash plate 76 to angle relative to the horizontal axis of rotation thereof. FIG. 5 shows the positions of the swash plate 76 and the four-bar linkage when the intermediate tube 35 is in its forwardmost translated position. The slots 85 through the inner tube 36 are long enough to permit forward translation of the tube 35 as described and to further permit rearward translation of the tube 36 for tilting of swash plate 77.

As described above, the inner tube is directly translated rearwardly by the pins 48 of the sleeve 37 of the blade assembly 10. The rearward translation of the tube 36 causes the swash plate 77 of the compressor unit 31 to be angled or tilted in a manner similar to that described above for the tube 35 and swash plate 76 of compressor unit 30.

The swash plate 77 comprises a ring 103 supported by a spoke assembly 104. The spoke assembly 104 extends through slots 105 and 106 in tube 25, slots 107 and 108 in tube 35 and slots 110 and 111 in tube 36. The hub of the spoke assembly 104 is secured to pin 112 which is journaled into diametrically opposed wall portions of tube 36.

The ring 103 of the swash plate 77 rotates within the follower plate assemblies 113 which are connected by ball joints to the ends of the piston rods of the piston and cylinder assemblies 72 of the compressor unit 31.

The four-bar linkage that reacts to the rearward translation of the tube 36 to produce an angling or tilting of the swash plate 77 relative to its horizontal axis of rotation in a clockwise direction as viewed in FIGS. 2 and 5 comprises the lever 114, the lever 115 and the bell-crank 116. One end of the lever 114 is pivotally connected to a bracket 117 which is secured to the outer surface of the main torque tube 25. The lever 114 extends through slots in the tubes 25, 35 and 36 and the other end thereof is connected to one end of lever 115. The other end of lever 115 is connected to spoke assembly 104. Bell-crank 116 is connected between lever 114 and spoke assembly 104. The four-bar linkage for the swash plate 77 operates as described for swash plate 76 to angle swash plate 77 in corresponding manner. As swash plate 77 is angled between the positions shown in FIGS. 2 and 5, it will nutate as it is rotated to reciprocate the piston and cylinder assemblies 72 of compressor unit 31 in the same manner as described for compressor unit 30.

A state of balance between the axial displacements of the tubes 35 and 36, so that they axially translate only in response to the drag force of the wind on the blade assembly 10, is achieved by the balancing assembly 12 shown in FIG. 3. The assembly 12 is mounted at the forward end of the machine and comprises a cylinder assembly 120 which is fixedly mounted on the forward end of the inner tube 36. The body of the cylinder assembly is tubular with the head end thereof closed by the plate 121. The rod end of the cylinder assembly 120 is provided with at least one pair of diametrically arranged spokes 122 which extend through slots 123 in the forward end of the tube 35 and are secured to the end of the tube 36. A piston assembly is mounted for reciprocating movement within the cylinder assembly 120. The piston assembly 124 is fixedly mounted on the forward end of the intermediate tube 35. An annular bag supporting member 125 is fixedly mounted within the cylinder assembly 120 against the plate 121. An appropriately shaped tubular sleeve or bag 126 formed of an elastomeric material is disposed within the cylinder assembly 120. One end of the sleeve 126 is fluid sealed about the inner end of the member 125. The other end of the sleeve 126 is fluid sealed about an inner circular projection of the piston assembly 124. A fluid bleed line 127 is connected from the compressor fluid outlet 73, through the plate 121 and the inner end of the member 125 to the interior of the sleeve 126. Fluid pressure within the sleeve 126 acts in opposite directions against the piston assembly 124 and the cylinder assembly 120 to effectively balance the axial displacements of the swash plates 76 and 77 through the tubes 35 and 36.

Futher control over the swash plates 76 and 77 may be provided by the compressor assembly 13 shown in FIG. 4. The assembly 13 is constructed within the rearward end of the main torque tube 25 and comprises a plate 128 secured over the rearward end of the tube 25, and a bag supporting member 130 secured within the tube 25 and against the plate 128. The rearward end of the inner tube 36 is provided with a circular plate or piston head 131. An appropriately shaped tubular sleeve or bag 132 formed of an elastomeric material is disposed within the tube 25 between the piston head 131 and the supporting member 130. One end of the sleeve 132 is fluid sealed about the inner end of the member 130 and the other end is fluid sealed about a circular projection on the piston head 131. A fluid conduit is connected through the plate 128 and the member 130 to the interior of the sleeve 132. Fluid under pressure is delivered through the conduit 133 to control pressures required to axially translate the tubes 36 and 35. The pressure of the fluid delivered through conduit 133 is provided by any known means to adjust the axial translation of the tubes 36 and 35 relative to specific translation or drag forces produced by the wind on the rotating blade assembly 10.

Having described the invention in one preferred embodiment, it will be understood by one skilled in the art that the invention comprises a unique matching energy collection system for collecting the energies of the wind into the energies of a compressed fluid, and that substantial changes can be made in the preferred embodiment within the spirit and scope of the invention as defined in the hereinafter following claims. Thus in some embodiments of the invention it may be preferred to fix the angle of the swash plates of the compressor units and to provide the cylinders of the compressor units with means for varying the clearance volume of the cylinders and with the translating blade assembly connected to that means to vary the clearance volume of the cylinders inversely with the drag force of the wind on the blade assembly. In that manner the torque reaction of the compressor assembly will match the applied torque of the wind turbine. Further, instead of using the drag force of the wind on the blade assembly, the lift force of the wind on the blade assembly, or some other equivalent force, may alternatively be used to match the torque reaction of the compressor assembly to the applied torque of the wind turbine. Additionally, while the described embodiment uses a mechanical linkage assembly to vary the torque reaction of the compressor assembly directly with the torque of the wind turbine, it may be seen that other known equivalent means may be used to provide that necessary control function. Such known equivalent means may be hydraulic, pneumatic or electrical devices.

I claim:

1. In a wind powered machine, a fixed pitch wind blade assembly rotatively mounted in said machine for rotation in response to the force of the wind against said blade assembly, a variable displacement fluid compressor mounted in said machine, rotatable drive means connected between said blade assembly and said compressor for rotatably operating said compressor responsive to the rotation of said blade assembly by the wind, and compressor displacement control means operatively connected between said blade assembly and said compressor for varying the fluid displacement of said compressor directly with the drag force of the wind on said blade assembly.

2. In a wind powered machine as defined in claim 1, said rotatable drive means being connected to rotatably operate said compressor at substantially the same speed that said blade assembly is rotated.

3. In a wind powered machine, a fixed pitch blade assembly, means mounting said blade assembly for rotation in response to the force of the wind against said blade assembly and for movement in an axial direction in response to the drag force of the wind on said blade assembly, a variable displacement fluid compressor assembly mounted in said machine, rotatable drive means connected between said means mounting said blade assembly for rotation in response to the force of the wind against said blade assembly and said compressor assembly for rotatably operating said compressor assembly responsive to rotation of said blade assembly, and compressor displacement control means connected between said means mounting said blade assembly for movement in an axial direction in response to the drag force of the wind on said blade assembly and said compressor assembly for varying the fluid displacement of said compressor assembly responsive to the movement of said blade assembly in said axial direction.

4. In a wind powered machine as defined in claim 3, wherein said variable displacement fluid compressor comprises an input member rotatable to rotatably operate said compressor, and said means mounting said blade assembly for rotation includes means mounting said blade assembly for rotation about a horizontal axis coaxial with the axis of rotation of said input member of said compressor.

5. In a wind powered machine as defined in claim 3, and said rotatable drive means being connected between said means mounting said blade assembly for rotation and said input member of said compressor assembly to rotate said input member at the same speed that said blade assembly is rotated.

6. In a wind powered machine as defined in claim 5, wherein said variable displacement fluid compressor assembly comprises at least one swash plate compressor, said input member comprising the swash plate of said swash plate compressor, and said compressor displacement control means including means responsive to the movement of said blade assembly in an axial direction for varying the degree of nutation of said swash plate directly with the axial movement of said blade assembly.

7. In a wind powered machine as defined in claim 5, wherein said means mounting said blade assembly for rotation in response to the force of the wind against said blade assembly includes a tubular member mounted in said machine for rotation about a horizontal axis and extending coaxially of the axis of rotation of said blade assembly and the axis of rotation of said input member of said compressor assembly.

8. In a wind powered machine as defined in claim 7, wherein said means mounting said blade assembly for movement in an axial direction in response to the drag force of the wind on said blade assembly comprises a tubular sleeve mounted concentrically about said tubular member, mounting means carrying said blade assembly on and to extend radially outwardly of said tubular sleeve to rotate said tubular sleeve responsive to the force of the wind against said blade assembly, and pin means connecting said tubular sleeve to said tubular member to rotate said tubular member responsive to rotations of said tubular sleeve and to permit said tubular sleeve to axially move relative to said tubular member responsive to the drag force of the wind on said blade assembly.

9. In a wind powered machine as defined in claim 5, wherein said variable displacement fluid compressor assembly comprises two swash plate compressors, said input member comprising the swash plate of each of said swash plate compressors, and said rotatable control means including means responsive to the movement of said blade assembly in an axial direction for contemporaneously varying the degree of nutation of said swash plates of said two swash plate compressor directly with the axial movement of said blade assembly.

10. In a wind powered machine as defined in claim 9, and balancing means connected to said swash plates of said two swash plate compressors for equalizing the degree of nutation of said swash plates.

11. In a wind powered machine, a fixed pitch wind blade assembly rotatively mounted in said machine for rotation in response to the force of the wind against said blade assembly, a rotary operable fluid compressor mounted in said machine, said fluid compressor comprising a fluid compressing assembly and first drive means rotatably operable to operate said fluid compressing assembly and further having adjustable means adjustable to vary the torque reaction of said fluid compressing assembly on said first drive means, second drive means connected between said blade assembly and said first drive means for operating said first drive means responsive to the rotation of said blade assembly by the wind, and control means connected to said adjustable means for adjusting said adjustable means to increase and decrease the torque reaction of said fluid compressing assembly directly respectively with increases and decreases of the square of the wind velocity of the wind on said blade assembly at wind speeds from substantially zero to substantially gale velocities.

* * * * *